United States Patent Office 3,320,187
Patented May 16, 1967

3,320,187
EPOXY RESIN FOAMING PROCESS
Samuel L. Burt, Huntsville, Ala., assignor to the United States of America as represented by the Secretary of the Army
No Drawing. Filed June 27, 1962, Ser. No. 206,549
19 Claims. (Cl. 260—2.5)

The invention described herein may be manufactured and used by or for the Government of the United States of America for governmental purposes without the payment of any royalties thereon or therefor.

This invention relates generally to expanded or foamed plastics and, more particularly, to rigid epoxy plastics of cellular structure and to a method for making the same.

It has been proposed heretofore to prepare expanded or foamed plastics having a low specific gravity or apparent density, and various methods have been proposed for introducing the voids into the plastic material to form the characteristic cellular construction. One such method comprises dissolving an inert gas, such as nitrogen, into the resinous polymeric or monomeric material in a pressurized reaction vessel and releasing the pressure, thereby foaming the plastic. This method is undesirable for the reason that pressurized apparatus is required, the apparatus being bulky and expensive. Another proposed method of foaming a resinous material comprises mixing a heat unstable compound, such as azo-bis-isobutyronitrile, in the resinous material and subsequently heating the resinous mixture to cause the azo compound to decompose and form nitrogen gas which forms bubbles or cells in the blown plastic. This process is undesirable because of the necessity to heat the resinous mixture to form the cellular plastic as well as the inflammable character of most of the blowing agents and the retaining within the foam of the residue of the blowing agent causing discoloration. A still further proposed method of forming an expanded plastic comprises adding to the resinous material a blowing agent such as a polyisocyanate which is reacted with water during curing, thus forming carbon dioxide gas. This method of blowing the resinous material is undesirable due to the cost of polyisocyanate. Also, the toxic isocyanate requires special handling as a safeguard to personnel.

The object of this invention is to provide a new and improved method of forming an expanded plastic.

A still further object of the instant invention is to provide a new, simple and inexpensive method for producing a stable foamed plastic.

Another object of the present invention is to provide a new and improved method of preparing foamed-in-place epoxy ether resins for potting purposes.

A still further object of the present invention is to provide a method for forming expanded plastics, said method involving the use of novel combined blowing and curing agents which leave no objectionable residue, are safe and non-flammable.

Generally speaking the foregoing objects, as well as others, can be accomplished in accordance with this invention by curing an epoxy ether resin with an amine and a carbamate of salt of an amine.

The preparation of epoxy ether resins is well known in the art. One of the valuable properties of epoxy ether resins is their ability to transform readily from the liquid state to tough, hard thermoset solids. This hardening is accomplished by the addition of a chemically active reagent known as a curing agent. Among the materials to gain generally acceptance as curing agents were the organic amines and polyamines. These amine curing agents are also known as activators or hardeners. Heretofore, it has generally been necessary to prepare foamed solid epoxy resins by introducing separately a gas or gas-producing material and the curing agent into the epoxy resin. As previously mentioned such process requires special equipment and techniques.

Foamed epoxy resins retain many of the properties of the unfoamed resin. For example, the foamed product possesses very good adhesive qualities making it useful in potting of various materials such as glass, metal, ceramics, etc. The foamed epoxy resins are further characterized by having little post-expansion shrinkage, usually less than 1%. The foamed epoxy resins are also of low density and provide a means of weight-saving when employed as fillers in aircraft or potting material for electronic components. These and other properties make the use of foamed epoxy resins very advantageous. Thus a method of foaming epoxy resins which overcomes the disadvantages of the prior art methods is highly desirable.

The novel process of the present invention utilizes an amine carbamate salt as a combined curing agent and foaming agent in the preparation of the foamed epoxy resins. The advantages of such a process are immediately apparent. Briefly, the expansion is taking place at the precise time that the necessary curing agent is present. The resin hardens just as it is being expanded eliminating the need of pressure to prevent the gas from escaping while curing is taking place. Moreover, the components of the combined curing and blowing agent of the process are utilized completely in the process, thus eliminating trapping of undesirable reagents in the foam structure.

Numerous amines are well known for their curing characteristics and are available commercially. The aryl polyamines such as 4,4'-diaminodiphenylmethane are useful curing agents. Alkylene polyamines, particularly polyethylene-polyamines of the formula $$H_2N-(CH_2-CH_2-NH-)_x-CH_2-CH_2-NH_2$$

wherein X has a value of 0–3 are especially suitable. Examples of such amines are ethylenediamine, diethylenetriamine, triethylene-tetramine and tetraethylenepentamine. Other suitable amines include dimethylaminopropylamine, diethylaminopropylamine, and propylamine. Heterocyclic amines such as piperdine are also useful.

The amine carbamate salts employed as the combined curing and blowing agent in the novel process of the invention are prepared in the usual manner by reacting the activator amine with carbon dioxide. This general reaction may be represented as follows:

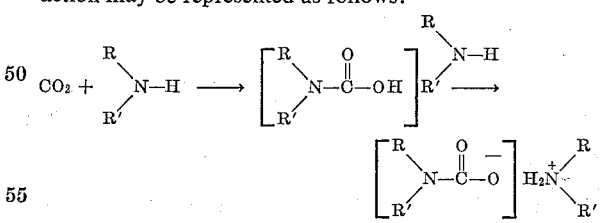

As is readily apparent to those skilled in the art, the composition of the radicals depicted as R and R' is limited solely to groups unreactive with carbon dioxide and amines, except that the radicals R and R' may contain additonal reactive amine groups. The preferred amine carbamate salts are those wherein both the amine reactants

are amine curing agents of the type previously discussed. Therefore, R and R' are normally alkyl and aryl hydrocarbon groups or amine substituted derivatives thereof. Specifically, R and R' represent the remainder of the amine curing agent when a hydrogen of one of the amine groups of the curing agent enters in the formation of the amine carbamate salt. When the amine curing agent employed as a reactant is diethylaminopropylamine,

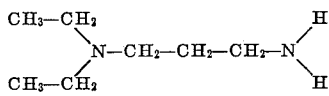

R is a hydrogen and R' is diethylaminopropyl. From the above representation of the reaction, it is seen that an N-substituted carbamic acid is produced as an intermediate and the acid then reacts with an additional amine group to yield the amine carbamate salt. The reaction between carbon dioxide and a common polyamine epoxy resin curing agent may be illustrated with diethylenetriamine. In this reaction the polyamine may form an inner salt such as illustrated below.

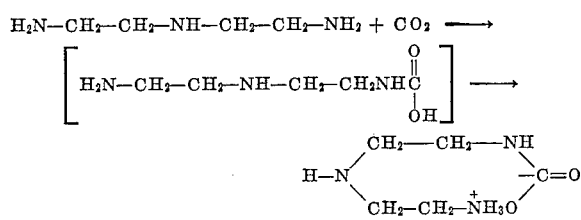

The secondary amine groups of the inner salt are also available for further reaction with carbon dioxide. Moreover, the carbon dioxide may react with the amine groups of two individual molecules of the polyamine as shown below.

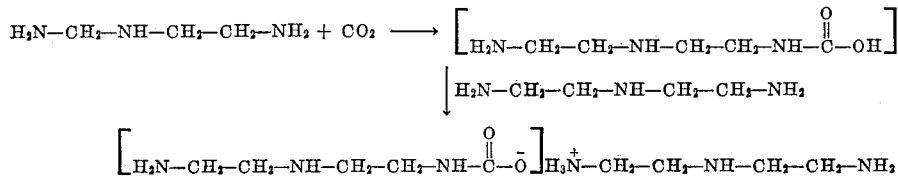

A complex salt may be produced consisting of molecules of diethylenetriamine and carbon dioxide linked by alternating covalent and ionic bonds. Thus, a variety of amine carbamate salts can be formed with a particular polyamine curing agent depending on the number of primary and secondary amine groups present in the polyamine and the manner in which they react.

Regardless of the particular arrangement in which the amines and carbon dioxide react to form the amine carbamate salt, the amine carbamate group

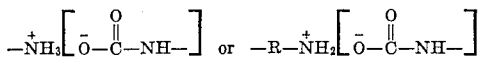

is always present in the salt depending on whether the particular amine entering the reaction is a primary or secondary amine. Of course, it is possible that both groups may be present as is apparent from the discussion above.

Upon heating, the amine carbamate salt decomposes into carbon dioxide and the amine reactant used in the preparation of the salt according to the following reactions:

1(a) 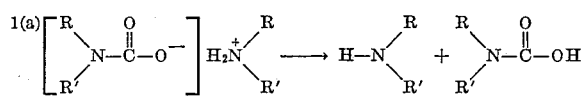

1(b) 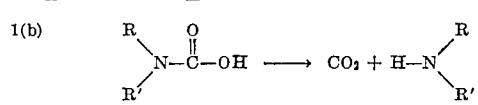

The carbamic acid intermediate is unstable and decomposes immediately into carbon dioxide and the amine component.

These amine carbamate salts yield a blowing agent and a curing agent simultaneously upon decomposition.

Therefore, at the very time the expansion is taking place in the epoxy resin, as a result of the evolution of carbon dioxide, an amine curing agent is also being produced to harden or set the resin in its expanded or foamed state, speeding the cure at the time of foam formation.

The technique for preparing the amine carbamate salt is conventional in the art. The desired amine is placed in a suitable open vessel and carbon dioxide is bubbled through the amine. As the amine salt is produced it crystallizes. Since the reaction is exothermic, it is desirable to provide a means of cooling the reaction vessel. It is not essential that the amine reagents be chemically pure. Minor amounts of water and trace impurities do not complicate the preparation of the salt or the use of the resulting salt in the novel process of the invention. The amines as available commercially in the degree of purity normally employed for curing resins are quite acceptable. Even if water is present in the amine salts, this will not adversely affect the process since the water will be vaporized under the conditions of the process and assist in the blowing of the resin.

Suitable epoxy ether resins are those prepared by reacting a dihydric phenol such as 2,2-bis-(4-hydroxyphenyl) propane, generally referred to as Bisphenol A, with epichlorohydrin. An example of such resins are those of the following formula

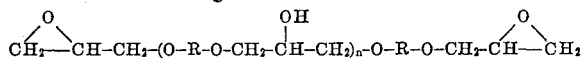

wherein $n$ has a value of .3 to 20 and R represents the hydrocarbon radical of the dihydric phenol such as Bisphenol A. (The term "dihydric phenol" is defined and illustrated in U.S. Patent 2,739,134.) These resins are readily available commercially as liquids and include Epon 812, Epon 815, Epon 820, Epon 826, Epon 828, Epon 830, Armstrong C-1 and Armstrong C-7.

According to one aspect of the present invention, part of the amine curing agent necessary to cure the resin is first reacted with carbon dioxide to form the carbamate salt. The liquid epoxy ether resin is then mixed with the remainder of the amine curing agent in an amount less than that required to cure the resin. It is desirable to allow enough time (10–60 minutes for example) for the heat from the exothermic reaction to elevate the temperature to the range of 50–60° C. This initial treatment with the curing agent serves to thicken the resin and to begin the gel stage. With the viscous material so obtained, the amine carbamate is then mixed. Evolution of heat occurs and when the mixture begins to turn white and expand as indicated by the evolution of carbon dioxide bubbles, the mixing is stopped. The mixture quickly expands to the foamed state because of the liberation of carbon dioxide from the amine carbamate salt and setting is completed by the release of additional amine curing agents which accompanies the decomposition of the salt. The initially hot resilient foam quickly completes its cure and cools to a light, rigid, foam structure with little post expansion shrinkage. The resulting material is usually allowed to stand up to twenty-four hours at room temperature (25° C.) or for proportionally shorter periods of time at slightly higher temperatures (up to 50° C.). Allowing the resin to stand to insure completion of the cure is not a peculiarity of the present invention but is generally characteristic of any of the methods for preparing foamed epoxy resins.

The order of adding the reactants is not critical. The epoxy ether resin, the amine curing agent, and the amine carbamate salt may be mixed together and the whole heated to the decomposition temperature of the amine carbamate salt. Alternatively, the amine curing agent and the amine carbamate salt may be mixed together and then added to the epoxy ether resin. Using 100 parts by weight of the epoxy resin as a base, the proportions of amine curing agent employed will generally vary between 1 and 5 parts by weight while the amount of amine carbamate salt will ordinarily range from 5–15 parts by weight.

If the exothermic heat of reaction is sufficient, it is not necessary to employ an external source of heat to bring the reaction mixture to the decomposition temperature of the amine. Generally, at least 4 parts by weight of amine curing agent per 100 parts by weight of epoxy resin are necessary to furnish sufficient exothermic heat to achieve the decomposition temperatures of the amine carbamate salts. This decomposition temperature is easily discernible due to the evolution of carbon dioxide bubbles and the expansion of the resin. Of course, the decomposition temperature will vary according to the particular amine carbamate salt employed. For example, the amine carbamate salt of diethylenetriamine decomposes at approximately 100° C. while tetraethylenepentamine decomposes at a somewhat higher temperature.

The invention is further illustrated by the following examples without being restricted thereto.

EXAMPLE 1

This example exemplifies the formation of the amine carbamate salt utilized in Examples 2–5 and is typical of the formation of the amine carbamate salts utilized in the invention.

A 100 ml. beaker is provided with a water bath for cooling. 50 ml. of commercial grade diethylene triamine is placed in the beaker. Carbon dioxide is introduced into the amine through a glass tube. The carbon dioxide is bubbled through the amine until all the amine is converted into a crystalline precipitate. Without further refining, this precipitate was employed in Examples 2–5.

EXAMPLE 2

| Composition: | Parts by weight |
|---|---|
| Epoxy ether resin (Armstrong C–1) | 100 |
| Curing agent (diethylene triamine) | 5 |
| Blowing and curing agent (diethylene triamine carbamate) | 10 |

The curing agent is added to the resin with intimate mixing. The mixture is allowed to react with the curing agent until the temperature of the mixture reaches 50–60° C. and a viscous resinous material is produced. At the end of this reaction period the combined blowing and curing agent is added. The mixture is stirred during which time the reaction proceeds rapidly with the evolution of heat. Stirring is stopped when the mixture turns white and begins to expand, which occurs at approximately 100° C. A rapid expansion of from five to ten times takes place with the formation of a firm gel which cures to a hard and tough state in a few hours.

EXAMPLE 3

| Composition: | Parts by weight |
|---|---|
| Epoxy ether resin (Armstrong C–1) | 100 |
| Curing agent (diethylene triamine) | 1–5 |
| Blowing and curing agent (diethylene triamine carbamate) | 5–15 |

In each case the resin is heated to 50° C. and both the curing agent and the combined blowing and curing agent are added with vigorous mixing. The exothermic reaction immediately sets in. Mixing is stopped when the material turns white and begins to expand, which occurs at about 100° C. A rapid expansion and cure take place as in Example 1.

EXAMPLE 4

The compositions are the same as in Example 2. The three components are initially mixed and the whole is then heated to 100° C. Without being further mixed, the composition expands and cures as in Example 1.

EXAMPLE 5

| Composition: | Parts by weight |
|---|---|
| Epoxy ether resin (Armstrong C–1) | 100 |
| Curing agent (diethylene triamine) | 1–5 |
| Blowing and curing agent (diethylene triamine carbamates) | 10–15 |

In each case the curing agent is added to the resin, intimately mixed and the composition is heated to 75° C. The combined blowing and curing agent is added and mixed. Stirring is continued until the exothermic reaction initiates the expansion process, approximately 100° C. Mixing is stopped and expansion and cure take place as in Example 1.

It is to be understood that the process of the invention is not limited to the use of Armstrong C–1, diethylene triamine and diethylene triamine carbamate. As indicated previously, other commonly used amine curing agents may be employed as well as the corresponding carbamic acid salts of these amines, the latter being the products of the reaction of carbon dioxide and the amine curing agent. Using diethylene triamine and its carbamate, foamed resins have been prepared from Epon 812, Epon 815, Epon 820, Epon 826, Epon 828, Epon 830, and Armstrong C–7.

Other possible combinations of reactants for producing useful foamed plastics include the following, the amounts being given in parts by weight.

(1) Diethylaminopropylamine (5 parts)+epoxy ether resin (100 parts)+amine carbamate salt of diethylaminopropylamine (10 parts).

(2) Diethylenetriamine (5 parts)+epoxy ether resin (100 parts)+amine carbamate salt of propylamine (10 parts).

These amine carbamate salts are the product of the reaction of carbon dioxide and the appropriate amine as explained elsewhere herein.

The density of the resins foamed in the previous examples ranges from 8.5 lbs./cu. ft. to 12.2 lbs./cu. ft. with an average of about 10.2 lbs./cu. ft. The compressive strength of samples varies from 68.4 to 210 lbs./sq. in. with an average strength of approximately 125 lbs./sq. in. The foamed product possesses excellent adhesive, electrical, and mechanical strength qualities.

The expanded or foamed plastics produced by the novel process of this invention may be employed in the same manner as the foamed plastics produced by the prior art methods. For example, the plastics may be utilized as fillers in the aircraft industry, thermal insulators, or as potting materials.

Although various specific embodiments of the invention set forth herein have been disclosed, it will be understood that there is no intention to limit the scope of the present invention to these specific embodiments alone, since they are for purposes of exemplification only. Many modifications as to the selection of reactants and the procedural steps of the process will be apparent to those skilled in the art. It is, therefore, intended that the scope of this invention be limited only by the appended claims.

I claim:

1. The process for making, stable, foamed-in-place resins which comprises:

(a) mixing a liquid epoxy phenolic ether resin with an organic amine curing agent for said resin and an amine carbamate salt thereby forming a mixture, said salt being the reaction product of an organic amine that is a curing agent for said resin with carbon dioxide, said mixture comprising a ratio of 1 to 5 parts by weight of amine curing agent and 5 to 15 parts by weight of amine carbamate salt for every 100 parts by weight of said resin;

(b) elevating the temperature of said mixture to the decomposition temperature of said salt and thereafter allowing the carbon dioxide evolved by said decomposition to expand said resin while said organic amine simultaneously released by said decomposition completes the cure of said resin.

2. The process according to claim 1 wherein said amine carbamate salt corresponds to the formula

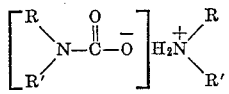

wherein R and R' are each a member selected from the group consisting of hydrogen, alkyl, aryl hydrocarbon groups, amine substituted alkyl, and amine substituted aryl hydrocarbon groups.

3. The process according to claim 1 wherein said resin and the organic amine curing agent are mixed prior to the addition of the amine carbamate salt.

4. The process according to claim 3 wherein the mixture of the liquid epoxy ether resin and the organic amine curing agent is brought to a temperature of 50° C. to 60° C. prior to the addition of the amine carbamate salt.

5. The process according to claim 1 wherein the exothermic heat of the curing reaction between said resin and said organic amine curing agent is allowed to elevate the temperature of the mixture to the decomposition temperature of the amine carbamate salt.

6. The process according to claim 1 wherein the reaction mixture is heated to the decomposition temperature of the amine carbamate salt through an external source of heat.

7. The process of claim 1 wherein the organic amine curing agent initially mixed with said resin is selected from the group consisting of 4,4'-diamino-diphenyl-methane, dimethylamino-propylamine, diethylaminopropylamine, propylamine, and polyethylene-polyamines of the formula $$H_2N-(CH_2-CH_2-NH)_x-CH_2-CH_2-NH_2$$

wherein X has a value of 0 to 3.

8. The process of claim 1 wherein said resin has the formula

wherein n has a value of .3 to 20 and R is the hydrocarbon radical of a dihydric phenol.

9. The process of claim 1 wherein the amine carbamate salt utilized in the process is the reaction product prepared by reacting an organic amine selected from the group consisting of 4,4'-diamino-diphenyl-methane, dimethylaminopropylamine, diethylaminopropylamine, propylamine, and polyethylene-polyamines of the formula $$NH_2-(CH_2-CH_2-NH)_x-CH_2-CH_2-NH_2$$

wherein X has the value of 0 to 3 with carbon dioxide.

10. The process of claim 5 wherein the organic amine curing agent is polyethylenepolyamine of the formula $$H_2N-(CH_2-CH_2-NH)_x-CH_2-CH_2-NH_2$$

wherein X has a value of 0 to 3.

11. The process of claim 10 wherein the organic amine curing agent initially mixed with said resin is diethylenetriamine.

12. The process of claim 8 wherein the dihydric phenol is bis-(4-hydroxyphenyl-2,2-propane.

13. The process of claim 9 wherein the organic amine utilized in making said salt is polyethylene-polyamine of the formula $$NH_2-(CH_2-CH_2-NH)_x-CH_2-CH_2-NH_2$$

wherein X has the value of 0 to 3.

14. The process of claim 13 wherein the amine is diethylenetriamine.

15. The process for making stable, foamed-in-place resins which comprises:

(a) mixing a liquid epoxy ether resin of the formula

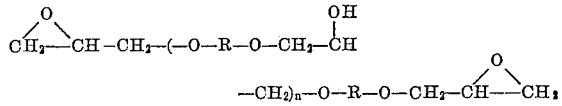

wherein n has the value of 0.3 to 20 and R is the divalent hydrocarbon radical of a dihydric phenol with polyethylene-polyamine curing agent of the formula $$NH_2-(CH_2-CH_2-NH)_x-CH_2-CH_2-NH_2$$

wherein x has the value of 0 to 3 while elevating the temperature of said mixture to a point in the range of about 50° C. to 60° C., thus forming a mixture of said resin and said curing agent, the ratio of the curing agent to the resin being from 1 to 5 parts by weight curing agent to each 100 parts by weight resin.

(b) adding to said mixture an amine carbamate salt formed by the reaction of carbon dioxide with polyethylene-polyamine of the formula $$NH_2-(CH_2-CH_2-NH)_x-CH_2-CH_2-NH_2$$

wherein x has a value of 0 to 3, the amount of said salt being at least that quantity which upon decomposition will furnish sufficient amine to complete the curing of said resin;

(c) elevating the temperature of said mixture to the decomposition temperature of said salt and thereafter allowing the carbon dioxide evolved by said decomposition to expand said resin while said organic amine released by said decomposition completes the cure of said resin.

16. The process of claim 15 where the polyethylene-polyamine utilized as said curing agent and in the preparation of the amine carbamate salt is diethylene-triamine.

17. The process of claim 16 wherein the reaction mixture of step (c) is elevated to a temperature of approximately 100° C.

18. The process of claim 17 wherein the variable R in said resin is the hydrocarbon radical of 2,2-bis(4-hydroxyphenyl)propane.

19. The process of claim 18 wherein 5 parts by weight of diethylenetriamine and 10 parts by weight of the amine carbamate salt of diethylenetriamine are employed for every 100 parts by weight of said resin.

References Cited by the Examiner

UNITED STATES PATENTS 2,739,134    3/1956    Parry et al. _____ 260—2.5
2,831,820    4/1958    Aase et al. _____ 260—2.5

OTHER REFERENCES

Chemical Abstract, vol. 43, p. 6157I.

MURRAY TILLMAN, *Primary Examiner.*

LEON J. BERCOVITZ, M. FOELAK, W. J. BRIGGS,
*Assistant Examiners.*